J. D. McGRATH AND C. H. McCARTHY.
RESILIENT TIRE.
APPLICATION FILED OCT. 9, 1919.
1,402,628.  Patented Jan. 3, 1922.
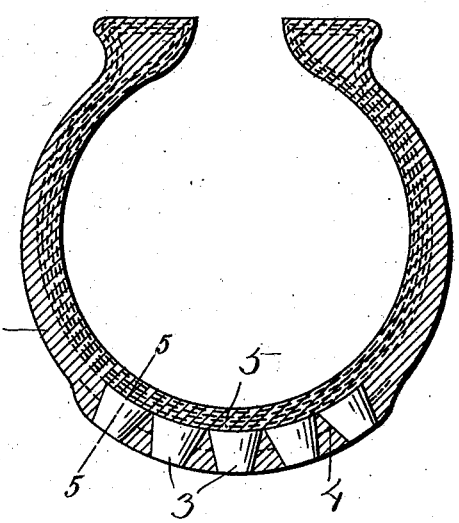
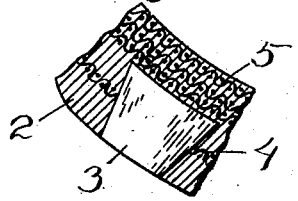
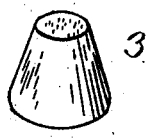
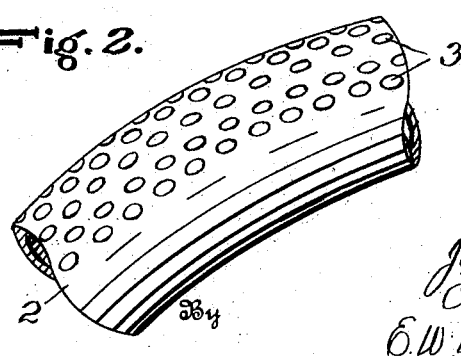
Inventor
John D. McGrath.
Charles H. McCarthy.
E. W. Anderson Jr.
  Attorneys

UNITED STATES PATENT OFFICE.

JOHN D. McGRATH AND CHARLES H. McCARTHY, OF NEW YORK, N. Y.

RESILIENT TIRE.

1,402,628.      Specification of Letters Patent.      Patented Jan. 3, 1922.

Application filed October 9, 1919. Serial No. 329,449.

*To all whom it may concern:*

Be it known that we, JOHN D. McGRATH and CHARLES H. McCARTHY, citizens of the United States, residents of New York, in the county of New York and State of New York, have made a certain new and useful Invention in Resilient Tires; and we declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a transverse section of our invention, as embodied in the casing of a pneumatic tire.

Figure 2 is a fragmentary perspective view of the invention.

Figure 3 is a detail perspective view of one of the blocks.

Figure 4 is a detail section on the line 5—5, Figure 1.

The invention has relation to resilient tires for vehicle wheels, and particularly to the casings of pneumatic tires, having for its object to provide improved means for increasing the life of said casings, for resisting puncture thereof and for preventing slippage or skidding.

The invention consists in the novel construction and combinations of parts, as hereinafter set forth.

In the accompanying drawings, illustrating the invention, the numeral 2 designates a pneumatic tire casing, having the usual backing or reinforcement.

Imbedded in the rubber of the outer tread portion of the casing are a plurality of annular series of small wooden blocks 3, 3, arranged respectively radially of the tire and in staggered relation. A fabric reinforcement strip 4, for the tread of the tire is preferably located midway of the radial length of the wooden inserts or blocks, which fit in perforations of said strip, being thereby braced and held more securely in position to strengthen the entire structure.

These small blocks of wood are tapered outwardly and are set in the rubber of the tread in the process of manufacture of the tire, being at their bases, which rest upon the backing or reinforcement 5, quite close together, (and in the case of a pneumatic tire, substantially in contact as shown) and at their outer ends, which are exposed at the tread of the tire, spaced apart by intervals of approximately triangular form in cross section, and filled in by the rubber of the tire.

In use, the tire will run substantially upon the smaller outer ends of the wooden inserts or blocks, which will take the greater part of the wear, while not interfering appreciably with the resiliency of the casing as a whole, thereby reducing liability of the casing to puncture to a minimum and preserving intact the tread of the tire for a greater mileage or longer life. The blocks or inserts have the general nature of protuberances exteriorly, or will have this nature as the tire casing becomes worn, thereby rendering the exterior of the casing rougher at the tread and preventing slippage or skidding.

The wood of the blocks or inserts is treated or oiled to preserve the same against absorption of moisture, and the grain of the wood is preferably longitudinal of the blocks, so that portions thereof will not become detached or broken off, thereby preserving the integrity of the blocks.

The blocks will be of frusto-conical or other tapered form as found best.

We claim:—

In a rubber vehicle tire, a reinforcing backing, a plurality of annular series of wooden blocks of greater puncture and wear resisting properties than and molded in the rubber of the tread of the tire, said blocks being radial of the tire and of frusto-conical form and located with their bases against said backing in substantial tangential contact with each other, and a fabric reinforcement strip molded in said tread and provided with perforations of diameters similar to the diameters of the middle portions of said blocks and the marginal walls of which engage and brace said blocks against outward movement midway of the radial length thereof.

In testimony whereof we affix our signatures in presence of two witnesses.

JOHN D. McGRATH.
CHARLES H. McCARTHY.

Witnesses:
C. W. KIRK,
H. CLIFFORD.